United States Patent [19]

Wesley

[11] 4,441,751

[45] Apr. 10, 1984

[54] COLLAPSIBLE HIGH SPEED EXTENSION FOR MOTOR VEHICLES

[76] Inventor: William M. Wesley, 21956 N. Hickory Hill Dr., Kildeer, Lake County, Ill.

[21] Appl. No.: 209,945

[22] Filed: Nov. 24, 1980

[51] Int. Cl.³ .................... B62D 35/00; B60R 19/04; B60R 19/10

[52] U.S. Cl. .................... 296/1 S; 105/2 R; 293/107; 293/132; 293/134

[58] Field of Search ................ 296/1 S; 293/107, 132, 293/134; 105/2 R

[56] References Cited

U.S. PATENT DOCUMENTS

| | | | |
|---|---|---|---|
| 3,744,835 | 7/1973 | Carbone et al. | 293/120 |
| 3,822,076 | 7/1974 | Mercier et al. | 293/107 |
| 4,095,835 | 6/1978 | Ensor | 296/1 S |
| 4,116,482 | 9/1978 | Spiegel | 296/15 |
| 4,131,309 | 12/1978 | Henke | 296/1 S |
| 4,142,755 | 3/1979 | Keedy | 296/1 S |
| 4,165,113 | 8/1979 | Casse | 293/120 |
| 4,176,858 | 12/1979 | Kornhauser | 293/107 |

*Primary Examiner*—Richard A. Bertsch
*Attorney, Agent, or Firm*—Neuman, Williams, Anderson & Olson

[57] ABSTRACT

A collapsible vehicle extension assembly for vehicles and a method for fabrication of such an assembly. The extension has an elastomeric outer shell and an inner structure of flexible non-stretchable membranes which define a plurality of separate air chambers when a gaseous medium is introduced into the outer shell. The interior membranes are semi-permeable to allow gradual equalization of pressures throughout the assembly during inflation while preventing the instantaneous deflation of each chamber from impact on the outer shell. Various interior chamber configurations are shown as well as a plurality of inflation techniques for different purposes.

38 Claims, 14 Drawing Figures

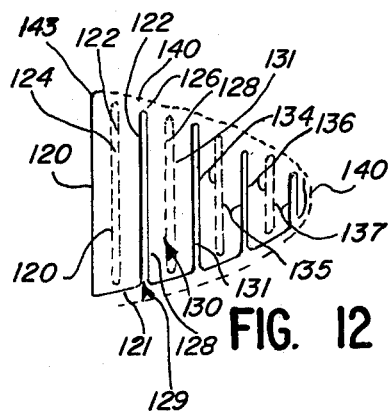
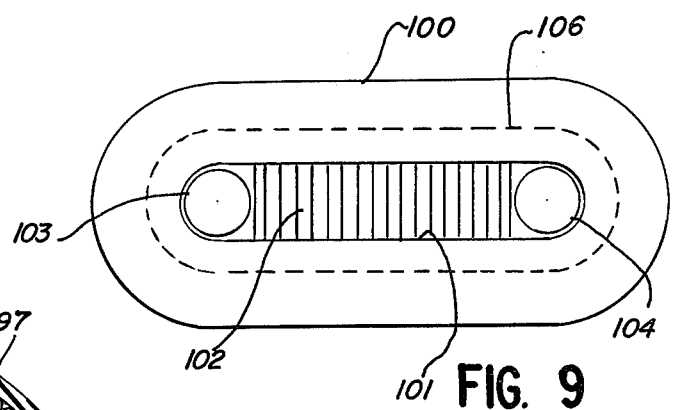
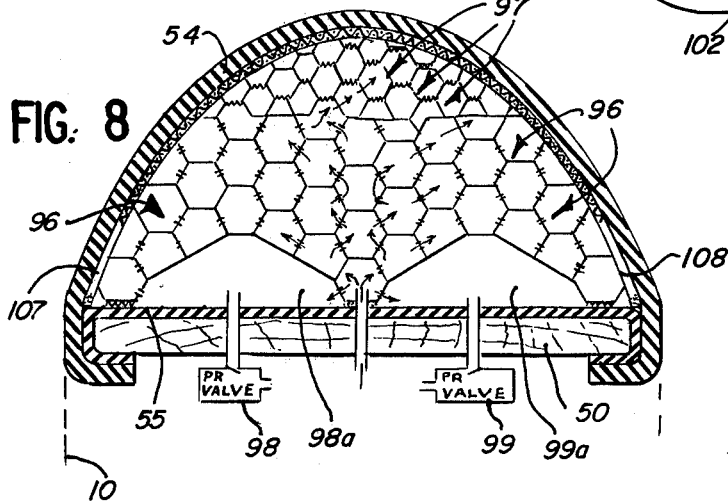
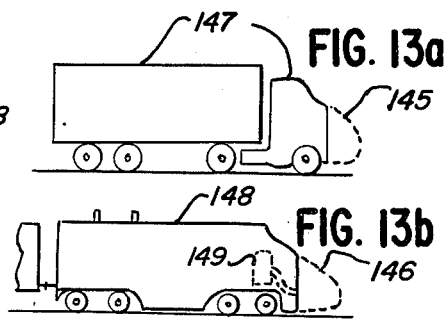
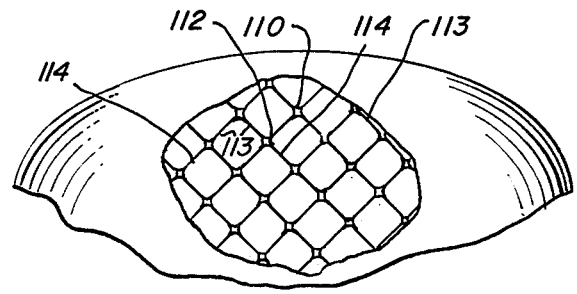
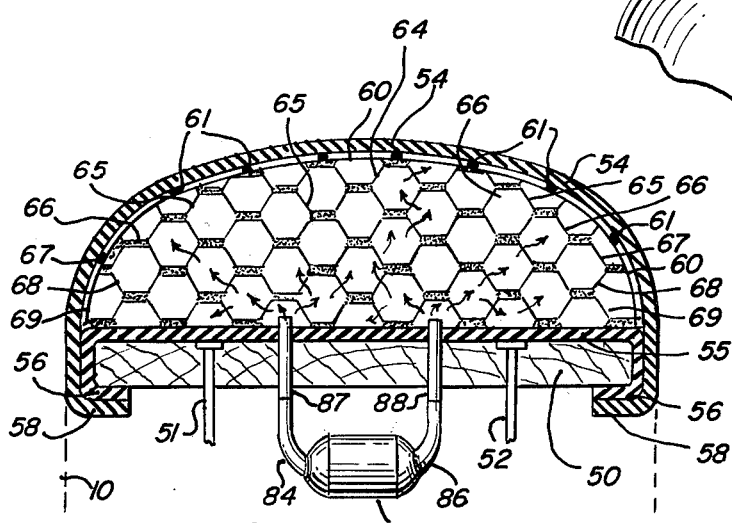
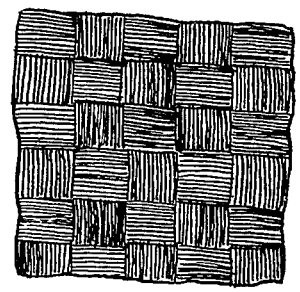

COLLAPSIBLE HIGH SPEED EXTENSION FOR MOTOR VEHICLES

FIELD OF THE INVENTION

This invention relates generally to vehicle safety devices and aerodynamics and, more particularly, concerns structural devices for vehicle and driver protection.

BACKGROUND OF THE INVENTION

The rapid reduction that has recently occurred in the size of automobiles has created a demand for safety devices to increase the survivability of collisions at medium to high speeds. Without the substantial amount of compressible sheet metal heretofore available in the automobile for protection during a crash, the driver is exposed to a risk of serious injuries and fatalities to a much greater degree than in the past. Furthermore, demands for lighter weight and greater fuel economy in automobiles makes it almost a certainty that the trend toward smaller, and heretofore more dangerous, automobiles is irreversible. As the size of the vehicle has decreased, a further drawback has been realized in that it is more difficult to utilize aerodynamic styling without sacrificing functionality. The trade-off faced by the designer is now between a sleek vehicle with a low drag coefficient and a small vehicle of light weight.

The present invention overcomes most of the problems described above through the provision of an inflatable vehicle extension that enhances the aerodynamic qualities of the vehicle, maintains a generally small size and weight of the vehicle and provides a safety factor not heretofore available in even the largest of vehicles.

SUMMARY OF THE INVENTION

These and other objects are achieved through the provision of a collapsible and inflatable vehicle extension mounted to the front, rear or sides of the motor vehicle. The structure may be permanently extended or, in the alternative, normally collapsed and semi-hidden to minimize the vehicle size during storage, parking and low speed driving. At high speeds, or at any other time at the option of the driver, the structure is inflated with a gaseous medium and expands to assume a shape which substantially protrudes from the vehicle to provide a cushion against the shock created upon impact with another vehicle or object. The structure typically has a substantially airtight outer shell of elastomeric material and an interior structure of flexible material which is substantially non-stretchable while at the same time being semi-permeable. The inner structure is preferably bonded together to form a honeycomb structure to create a plurality of separate compartments, each of which creates a separate pocket of air when inflated.

The shape of the extension assembly will vary depending on its position of use around the vehicle and, in particular, upon the aerodynamic requirements of the vehicle. Due to the constraints in size and weight, the front of most small vehicles sold today is aerodynamically poor. While the body may be streamlined in its longitudinal planar cross section, most vehicles are generally square in shape and poor aerodynamically when viewed from the top or bottom. The aerodynamic extension of the present invention, when used as a front-end extension, preferably assumes a conical cross section to provide an outwardly sloping curve that meets the front fenders of the vehicle. The extension is also contoured inwardly from both the top and bottom of the vehicle, the net result being that the air is separated and channeled into a laminar flow over the front of the vehicle in accordance with sound aerodynamic principles. Similarly, the projecting structure, when used at the rear of the vehicle, enhances the laminar flow of the air over the top, bottom and rear quarter panels of the vehicle so as to reduce drag and avoid the creation of turbulence.

Depending upon the application, the interior compartments are either of constant volume or, alternatively, of varying volumes to create "hardness" and "softness" in selected regions of the structure. While the primary application discussed is for a small automobile, it will be appreciated that the system has comparable applicability to larger vehicles and has particularly important advantages when applied to trucks and locomotives. Moreover, the extension assembly is a particularly useful application for certain lightweight flexible fabrics such as Dacron and Du Pont's Kevlar which offer a strength-to-weight ratio substantially higher than that of steel.

Various alternative embodiments of the invention are set forth below.

Other objects and advantages of the invention will become apparent upon reading the following detailed description and upon reference to the drawings, in which:

BRIEF DESCRIPTION OF THE DRAWINGS

FIG. 4 is a cross-sectional view of the vehicle extension taken along the line 4—4 in FIG. 3.

FIG. 8 is a top view, in cross-sectional form, of still a further embodiment of the present invention showing honeycomb compartments of varying size and density in a conical-shaped extension.

FIG. 9 is a front view of still another embodiment of the present invention in which the extension assembly is doughnut-shaped to accommodate the grill and headlights of the vehicle.

FIG. 10 is a top view of a portion of a vehicle extension which is partially broken away to reveal a diamond-shaped matrix of interior compartments rather than the hexagonal-shaped compartments of the previous embodiments.

FIG. 11 is a plan view, greatly enlarged, of the weave structure of a semi-permeable synthetic material which may be used in the present invention.

FIG. 12 is a side cross-sectional view of the interior support structure of the vehicle extension illustrating one method of fabrication utilizing a single sheet of material folded upon itself.

FIG. 13(a) and 13(b) depict the extension assembly of the present invention applied to larger vehicles including a truck and a locomotive, respectively.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

DESCRIPTION OF THE PREFERRED EMBODIMENTS

Figure 1:
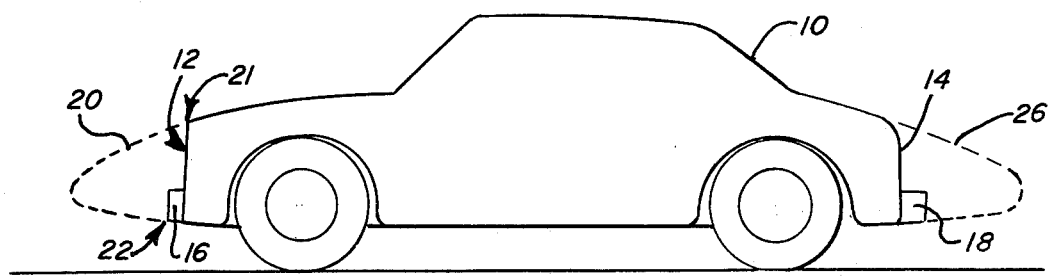
FIG. 1 is a side view of an automobile with a vehicle extension device constructed in accordance with the present invention depicted in broken lines.

Turning first to FIG. 1, there is shown a vehicle 10 depicted in a side view and having a conventional front-end surface 12 and a rear surface 14. A conventional bumper 16 protrudes from the front-end 12, while a rear bumper 18 protrudes from the back surface 14. In accordance with the principles of the present invention, a vehicle extension 20 is shown at the front of the vehicle in broken lines. This extension 20 is conical in shape and size to encompass substantially the entire front-end or grill assembly of the vehicle. As such, air flows smoothly into the contours of the vehicle hood at 21 as well as into the contours of the lower front fenders at 22. The vehicle extension 20, which will be described more fully below, thus enhances the aerodynamics at the front-end of the vehicle by masking the broad, flat front face of the vehicle and providing a conical shape to split the air and channel it into laminar flow across the bottom and top of the vehicle front-end, thus reducing surface drag and turbulence at the front-end of the vehicle. A corresponding increase in speed and economy should result.

Similarly, projection means are provided at the rear of the vehicle for reducing aerodynamic drag normally associated with sharply truncated vehicle designs. To this end, the embodiment of FIG. 1 includes a rearward facing conical extension 26. The extension 26 is again depicted in broken lines. Preferably, the forward end of the extension 26 is broadened to encompass substantially the entire truncated rear surface of the vehicle 10 while being tapered to a rounded nose at its rearward most projection.

Figure 2:
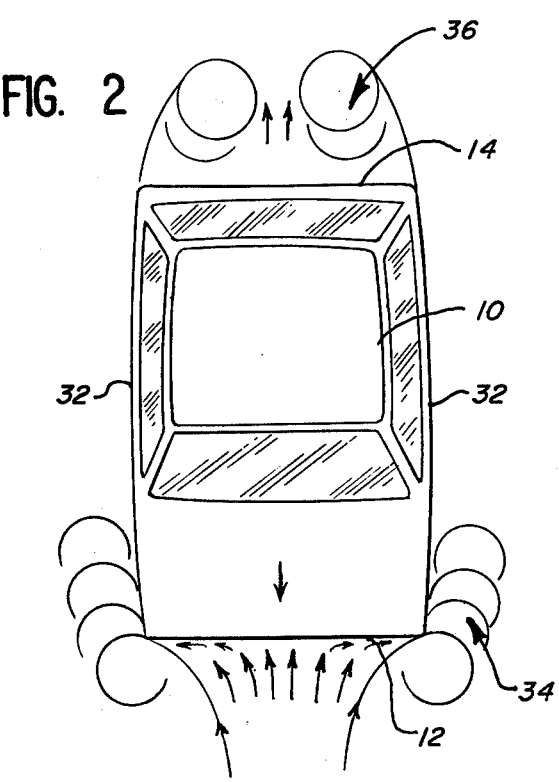
FIG. 2 is a top view of a compact vehicle showing normal airflow patterns and turbulence resulting from the aerodynamics of the vehicle.
Figure 3:
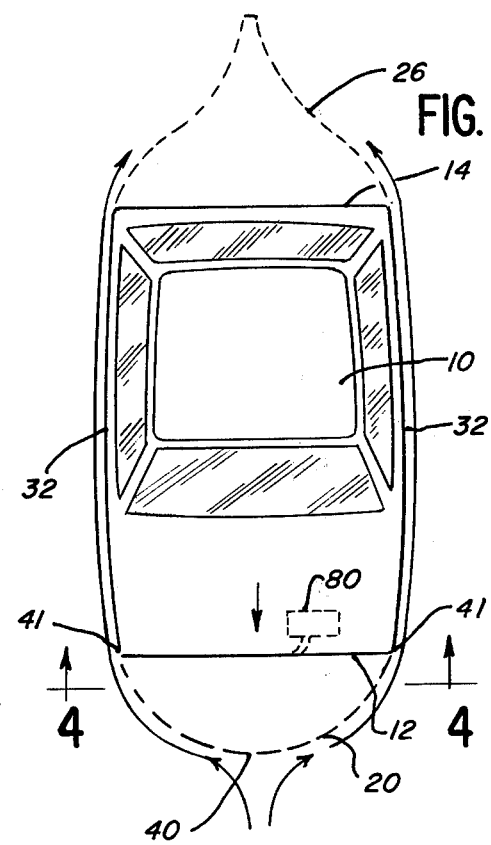
FIG. 3 is a top view of the vehicle shown in FIG. 2 with the vehicle extensions of the present invention attached so as to create a laminar airflow pattern.

The aerodynamic advantages achieved by the invention are shown in FIGS. 2 and 3. In FIG. 2, the normal vehicle shape is shown from the top and is seen to be generally rectangular in form. Due to the sharp angular discontinuity between the flat front face 12 and the rearwardly extending side faces 32, the airflow across the front of the vehicle is forced into substantial turbulence at areas 34 near the corners of the vehicle. Similarly, the sharp discontinuity between the side surfaces 32 and the truncated rear portion 14 of the vehicle creates areas of turbulence 36 at the back of the vehicle which increase drag and energy consumption.

The effects of increased turbulence and drag are particularly pronounced at higher speeds, at which 50% or more of the total energy needed to propel the vehicle is consumed in the tasks of separating the air and overcoming drag. The diagram of FIG. 3 shows how this problem is addressed with the vehicle extensions of the present invention. The front vehicle extension 20 separates the air over a narrow conical point 40 and begins accelerating the air outward at a gradual rate so that it remains in substantially laminar flow as it passes the outer edges 41 of the fenders. The amount of air that must be accelerated to the side at high speed is substantially limited to the area at the exact tip of the nose designated by the numeral 40. Contrast this to the normal vehicle configuration of FIG. 2 where a substantial volume of air across the entire face of the vehicle must be accelerated outward at a high rate of speed. Similarly, a rearward extension 26 on the truncated back surface 14 of the vehicle substantially enhances the laminar flow of the air around the rear quarter panels of the vehicle without creating the degree of turbulence shown at 36 in FIG. 2.

The degree to which the extensions 20 and 26 may be extended depends upon numerous factors, including the speed at which the vehicle is expected to move, the weight of the vehicle and the desired degree of protection for the vehicle and its occupants, as described below.

Figure 5:
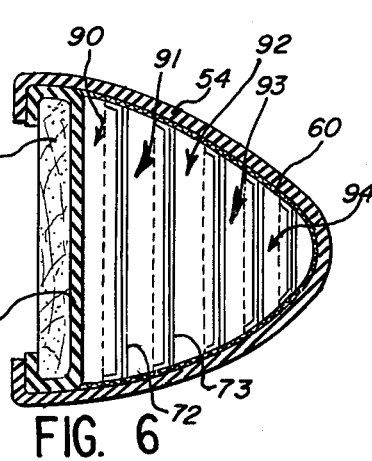
FIG. 5 is a side view of the vehicle extension of the present invention in its collapsed form.
Figure 6:
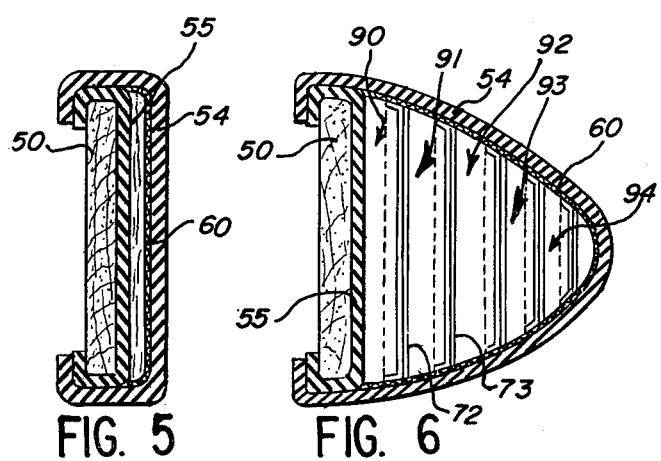
FIG. 6 is a side view of the extension shown in FIG. 5 in its inflated or expanded form.

FIGS. 4, 5 and 6 depict the internal structure of one form of the vehicle extension of the present invention. Turning first to FIG. 4, the assembly includes a backplate member 50 for supporting the structure of the extension assembly and having at least two bolts 51 and 52 extending through the support member and into engagement either with the vehicle bumper or with the vehicle chassis once the bumper is removed. The support member 50 can take any of a variety of configurations depending upon the front-end characteristics of the vehicle. In general, however, it should be of a size to allow it to substantially cover the entire vehicle front-end if the optimum amount of protection and aerodynamic assistances is to be achieved. The material used for the support member 50 may be any of a plurality of rigid or semi-rigid materials including wood, particle board, aluminum or any of a variety of other metals or plastic materials.

An outer shell structure is provided for serving the dual function of protecting the internal structure of the extension assembly and providing a resilient, expandable surface which allows the assembly to assume a plurality of contours while maintaining a desirable esthetic appearance. The elastomeric shell includes a forward portion 54 and a rearward portion 55. The elastomeric material used for this purpose is preferrably rubber. The rearward shell portion 55 overlies the support member 50 and laps around the edges thereof to create a flange area 56 behind the support member 50. The forward section 54 of the outer shell similarly wraps around the edges of the support member 50, as shown by the flange areas 58. The thickness of the material shown in FIGS. 4, 5 and 6 is exaggerated for the purposes of description, and it will be appreciated that the gauge of both the outer shell and the inner membrane structure will be chosen in accordance with the expected duty for the extension assembly as a whole. For heavy-duty vehicles such as trucks, trains or for large luxury vehicles the materials used will be substantially thicker than is required for a lightweight compact or subcompact vehicle.

For the purpose of establishing a shape and maintaining the structural integrity of the vehicle extension, the embodiment of FIGS. 4-6 includes an interior structure of flexible material which is substantially non-stretchable and which is coupled to the inside surfaces of the outer shell sections 54 and 55. To this end, the interior structure is depicted as including a forward skin portion 60 which is bonded to the elastomeric outer shell portion 54 at a plurality of points 61. The bonding between the flexible skin 60 and the elastomeric shell section 54 may be accomplished with any of a plurality of adhesives useful for bonding synthetic fabrics to rubber or similar flexible materials.

The skin portion 60, as noted above, is preferably made of a material which is strong, flexible and semipermeable to gases. For more heavy duty applications a tightly woven fabric of Du Pont's Kevlar fibers is preferred. Kevlar is an aromatic polyamide containing para-oriented linkages. This fabric offers the desired properties of light-weight, high flexibility, and semipermeance to air movement while having a tensile strength five times that of steel measured on a strength-to-weight basis. Heavy, tightly woven, dacron polyester of the type commonly used for aircraft wing construction is also suitable for this purpose and is light in weight. Typical brands for this material are Ceconite and Poly-Fiber. Adhesives suitable for use with the flexible material include the brands Ceconite Super Seam Cement and Poly-Tak.

In order to establish a desired contour for the overall vehicle extension, the outer skin 60 of the flexible internal material is preferably shaped to the desired contour and lapped around the edges of the support member 50 in a sandwich between the inner and outer sections 54 and 56 of the shell structure. An adhesive is preferably provided around the entire edge of the support member 50 between the elastomeric sections 56 and 58 and the flexible skin portion 60 as well as between the support member 50 itself and the inner shell portion 56. Additional mechanical attachment may be provided as necessary.

To insure further internal support for the extension assembly and to compartmentalize the extension into a plurality of separate air pockets, an interior matrix of membranes is provided. These membranes are preferably of the same dacron or other polyester material used for the skin portion 60, although it is desirable to use heavier material or multiple thicknesses for the skin portion 60 due to the greater pressure differentials that will occur across the outer skin 60. While a variety of different techniques may be used to achieve the hexagonal honeycomb structure shown in FIG. 4, the structure may be achieved through the selective interconnection of a plurality of separate wall portions 64-69, each of which extends laterally across the extension in a zig-zag pattern. The wall portions 65-69 may themselves be part of a single sheet of material folded repeatedly upon itself, as illustrated more graphically by the fold pattern depicted in FIG. 12. Adjacent wall portions are bonded to each other at staggered intervals to create dual thickness wall portions as shown at 72 and 73. The bonding is provided by suitable fabric cement such as Poly-Tak, as noted above. Care is taken in the formation of the honeycomb structure as well as in the shaping of the flexible skin 60 so that upon achievement of the desired shape through inflation of the assembly, all of the membranes internal to the assembly are in their taut condition. In this way, each of the air pockets created in the honeycomb structure will, upon inflation, assume the optimum shape for resisting deformation upon impact by another vehicle or object against the vehicle extension.

Figure 7:
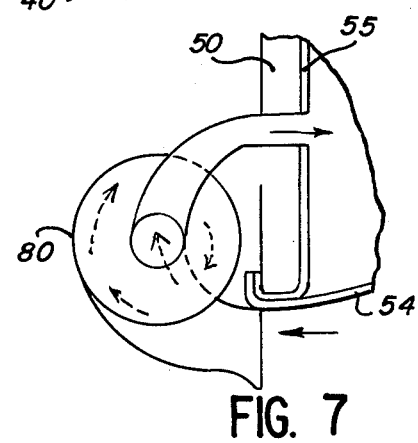
FIG. 7 is a side view of a portion of the vehicle extension depicting an associated air pump for inflating the extension.

For the purpose of introducing a gaseous medium into the outer shell of the vehicle extension, an air source 80 is shown in FIGS. 4 and 7. The source 80 may be a pump of any of a variety of types and shapes, but, as shown, it constitutes a squirrel cage assembly having an intake passage 82 and a pair of outlet conduits or hoses 84 and 86. The outlet hoses 84 and 86 are, respectively, connected to a pair of inlet valves 87 and 88 extending through the support member 50 into the interior of the extension assembly proper. The air source 80 may also be a cannister of highly compressed gas rather than a pump as shown. Suitable valving means remotely controllable by the operator allows inflation of the extension from the compressed gas source 80 at a rate substantially greater than otherwise available from a pump but slow enough to allow passage through the interior membranes of the extension. This alternative air source will be discussed more fully below in connection with the embodiments of FIG. 13.

Arrows are shown depicting the primary distribution pattern of the air within the matrix of flexible membranes. Due to the substantial rigidity of the adhesive bearing portions of each of the honeycomb structures, most of the air will pass through the areas of the membrane between the adjacent adhesive portions. FIG. 5 shows the total assembly in its relaxed form, with the outer section 54 of the shell being retracted to compress the interior membrane material against the support member 50. In appearance this structure looks like a typical solid rubber bumper, albeit somewhat larger in the frontal area. FIG. 6 shows the same assembly inflated to its full dimension. The view in both FIGS. 5 and 6 is from the side rather than from the top as in FIG. 4. As noted in FIG. 6, inflation of the assembly produces vertically extending hexagonally-shaped air pockets 90-94. These pockets are subtantially closed in their lateral direction through the bonding of the honeycomb structure, the tops and bottoms of each of these chambers being closed by bonding of the upper surfaces thereof by suitable adhesive to the outer membrane 60. It will be appreciated also that the outer membrane 60 may, in fact, be formed by selective lapping of the vertically extending interior membranes 64-69 so that each shuts off air to the next area. The complexity of formation in this manner may be somewhat greater than is experienced through the use of a single outer membrane 60, however.

For the purpose of controlling the transfer of air from chamber to chamber at a controlled rate, the material chosen for the membranes 65-69 is semi-permeable in nature. The dacron material referred to above achieves this quality through a weave pattern which is generally depicted in FIG. 11. Approximately 95 to 98% of the cross-sectional area of the material is filled by fiber strands. The degree of permeance to air may be controlled by selective application of dopes or lubricants to the fiber so as to reduce its porosity. Proper initial choice of fiber density is the preferable method for controlling permeability, however. Where very high degrees of rigidity must be achieved, a very heavy and dense flexible material may be used with the provision of mechanical vents between adjacent chambers of the honeycomb structure. Whatever the selection of venting means chosen, the time constant for air transfer through the material is the desirable characteristic to be controlled. The membranes should preferably be permeable enough to allow the pressure to equalize between adjacent cells in a matter of seconds, while preventing instantaneous pressure equalization that would otherwise result upon impact in the absence of an intercellular structure. To understand this principle, consider an air bag having no intercellular structure. An impact at any point by a blunt object forces instantaneous equalization of the pressure throughout the entire volume, and substantial bulging and distortion occurs if the volume is bounded by an elastomeric material. With the semi-permeable internal membranes disclosed herein, this immediate equalization of pressure is prevented. An impact against any one of the air chambers, such as the chamber 95, for example, results in an immediate pressure increase in that chamber but distribution of the pressure to adjacent chambers occurs only at a gradual rate through the membranes of adjacent cell chambers. Even if a given chamber is penetrated through the flexible skin 61 and the elastomeric material 54, air may only escape instantaneously from the single chamber penetrated, while the adjacent chambers substantially retain their rigidity and inflation to gradually absorb the shock from impact.

The vehicle extension may take a variety of alternate forms depending upon the application and desired appearance. FIG. 8 depicts a cutaway view from the top of a substantially conical extension having a much greater number of individual cells in the honeycomb than in the embodiment shown in FIGS. 4–6. The strength of the extension is proportionately increased.

This embodiment demonstrates several additional features of the present invention. For example, the interior structure may encompass air chambers of various volumes. The chambers 96, for example, are substantially larger than the chambers 97. The pressure capacity of the chamber membranes varies in inverse relation to the cross-sectional area of the chamber. As such, the outer shell of the unit may be substantially "stiffened" through the use of smaller honeycomb cells. Conversely, certain applications make it desirable to have a softer outer surface than an inner area so that the bumper assembly as a whole becomes stiffer as it is compressed to a greater degree during impact. This is accomplished by making the air chambers of progressively smaller volume from the outside to the inside of the structure. It will be appreciated, therefore, that a single extension unit may utilize a wide variety of cell sizes and configurations, depending on the application.

As a further feature of the embodiment of FIG. 8, pressure relief means are depicted in the form of a pair of valves 98 and 99. The pressure relief valve 98 responds to a predetermined pressure to vent an associated chamber 98a of substantially larger volume than the chambers 96 and 97. The pressure relief valve 99 performs a similar function for an enlarged chamber 99a. The chambers 98a and 99a effectively provide a controllable "cushion" against which the forward chambers 96, 97 may compress during impact, thus preventing premature rupturing of the membranes of the chambers 96 and 97. The maximum pressure allowable in the chambers 98a and 99a without activating the pressure relief valves 98 and 99 is preferably chosen to be slightly below the maximum pressure to which any of the chambers 96, 97 may be subjected without rupturing. Another pressure relief technique that may be utilized is the provision of chosen zones of weakness 107, 108 in the outer shell elastomer 54 that can selectively bulge outward to absorb the air displaced upon impact at the forward end of the extension.

The embodiments of FIGS. 4–8 are particularly attractive for vehicles not requiring air passage through the front grill. As such, they are best adapted to electric vehicles, rear engine vehicles or other vehicles having auxiliary cooling equipment. To maintain air flow to a conventional front-mounted engine an air scoop or duct can be provided below or on either side of the inflatable extension. As an alternate approach for front-engined vehicles, the embodiment of FIG. 9 depicts a doughnut-shaped vehicle extension 100 having an interior aperture 101 which opens to a grill 102 and a pair of headlights 103 and 104. Preferably, the extension 100 has a conical cross-sectional configuration at any point similar to that shown in FIG. 6, with the tip of the conical portion being indicated by the broken line 106 in FIG. 9. In addition to facilitating laminar airflow around the edges of the vehicle, this configuration actually increases the amount of airflow through the grill 102 because it traps and channels to the grill 102 all of the air accepted within the scoop defined by the outer protrusion 106 of the conical contour. The air will, of course, pass through the grill 102 at a substantially greater velocity than is available without the extension assembly 100.

Under severe impact the honeycomb structure provides for progressive breakdown of the cell structure from the outside inward. This is due to the fact that the pressure differential is always greatest between the outside air chambers and the exterior of the structure. As such, a chain reaction occurs as the chambers rupture successively and a proportionately greater resistance to impact occurs as the result. Additionally, as more chambers rupture, more are exposed to lower pressure zones so that air can be exhausted from the remaining chambers without rupturing of the walls. The point of initial breakdown is controlled by choosing an outer membrane or skin of a desired strength.

Still a further variation of the present invention is shown in FIG. 10, wherein the internal web structure is somewhat simplified by providing spot connections, as shown at 110 and 112, between adjacent membranes. The resulting air chambers are square or diamond-shaped in configuration and somewhat less rigid than the chambers shown in FIGS. 4 and 8, but they nonetheless provide a similar result in resisting impact. A single sheet of flexible material may form each of the membranes 113 and be folded in a continuous W shape. The adjacent membranes, such as the membrane 114, may similarly be part of a single sheet of material.

FIG. 12 depicts a preferred method for fabrication of the interior structure of the present invention. This figure depicts a cross-sectional view, taken from the side, of the sheet material used for the interior structure and the fold pattern for the material. A rear wall 120 of the sheet material is normally bonded to the back surface 55 of elastomeric material (see FIG. 6) and is folded upon itself at 121 to form a second membrane 122. At spaced, regular locations across the face of the assembly the first and second membranes 120 and 122 are gathered together, as shown at 124, and bonded by adhesive. From the second membrane 122 the sheet material continues and is folded back at 126 upon the membrane 122 to form a third membrane 128 which, in turn, is bonded at spaced locations 129 to the wall or membrane 122 and at alternately spaced locations 130 to the next membrane 131. Additional laterally disposed membranes 134–137 are similarly formed from successive folds of the single continuous sheet upon itself, as shown. The end result of this folding and adhesive pattern is a honeycomb structure in which alternate air chambers open to the bottom and top of the structure, respectively, such that the axial air pressure from the chambers in the vertical direction is equally shared between the top and bottom of the structure. An outer shell or membrane 140 is formed and bonded around the expanded honeycomb structure just described to define the desired exterior contour for the extension. For additional rigidity and simplicity of construction, the outer skin or shell 140 may be an integral extension of the back wall 120 of the honeycomb structure folded along the top of the wall 120 at 143. In this manner the entire interior structure of the extension assembly may be formed of one continuous sheet of material.

As noted above, the shape and strength of the extension assembly can be varied to suit the application. Examples of this are depicted in FIGS. 13(a) and 13(b), wherein extensions 145 and 146 are mounted, respectively, to the front ends of a truck 147 and a locomotive 148. For trucking applications the extension assembly provides the same advantages of safety and economy (from improved aerodynamics) as discussed above for other vehicles. In both the truck and locomotive applications, of course, the extension may be sized and stiffened for protection during collisions with automobiles only or for protection of the host vehicle from other trucks or locomotives or, for that matter, from solid immovable objects.

For locomotive and trucking applications in particular the use of a compressed gas source for inflating the bumper extension is preferred over a pump. The mass of these vehicles makes prompt stopping in short distances impossible. A train may take hundreds of feet to stop. Often the operator of such vehicles has several seconds to react before the collision, but the helplessness he must endure during that period induces severe and long-lasting trauma in the operator, not to mention the consequences to the vehicle hit by the train and its occupants. Through provision of a compressed gas source 149 and appropriate valving means which are remotely controlled by the operator, the extension 146 may be inflated into its expanded shape during those brief few seconds before a collision. This is due to the fact that the semi-permeable membranes separating the interior compartments of the extension assembly are porous enough to allow full expansion and equalization of pressure throughout the extension shell in a matter of seconds while being rigid enough to prevent collapse of the membranes upon impact in the manner described above.

It will be appreciated that the apparatus and method of the present invention is particularly suited to small lightweight vehicles, since virtually all flexible materials have inherent strength limitations. However, it is precisely for this type of vehicle that the advantages of the extension system of the present invention are the most important. It should further be appreciated that the benefits in the form of enhanced aerodynamic properties do not require an abundance of strength. As such, the extension assembly of the present invention has applicability to the improvement of the aerodynamics of trucks, trains and other heavy highspeed vehicles that can benefit from a method of streamlining that does not require significant additional size or weight.

I claim as my invention:

1. An extension assembly for selectively altering the aerodynamic shape of a vehicle comprising:
   a substantially air-tight outer shell of elastomeric material having a first desired contour when in the relaxed state
   an interior structure of flexible material which is substantially non-stretchable and which is coupled to the inside of said outer shell, said inner structure being shaped to define a second desired contour when it is tautened, and
   means for selectively introducing a gaseous medium into said outer shell so that the outer shell and inner structure expands from said first desired contour toward said second desired contour.

2. An extension assembly according to claim 1 wherein said first desired contour is a thin, substantially flat bumper-shaped contour having adequate low speed aerodynamic properties and wherein said second desired contour is an extended conical shape having enhanced high speed aerodynamic properties.

3. An extension assembly according to claim 2 wherein said outer shell has a planar dimension which spans the forward face of the vehicle front-end and wherein the second desired contour achieved by said interior structure is a forwardly extending conical shape which enhances the laminar flow of air around the front end of the vehicle.

4. An extension assembly according to claim 1 wherein said outer shell is doughnut-shaped with a forward facing conical cross section when inflated to provide an air passage to the center of the front of the vehicle while enhancing the aerodynamics at the edges of the front of the vehicle.

5. A vehicle extension assembly according to claim 1 further including a frame member for supporting the outer shell of said assembly and means for fastening said frame assembly to said vehicle.

6. A vehicle extension assembly according to claim 5 wherein said frame member is a plate adapted to mate with the forward face of the vehicle and wherein said outer shell of elastomeric material includes a first section attached to said frame member and overlying its face and a second section of said material overlying said first section, said frame member and said interior structure so as to sandwich said interior structure between the inner and outer sections of the shell in an air-tight container.

7. A vehicle extension assembly according to claim 6 wherein said interior structure has a first sheet portion of said flexible material bonded to the first section of said outer shell and a second portion of said flexible material bonded to the interior of the second section of said shell.

8. A vehicle extension according to claim 7 wherein said inner structure further includes a plurality of vertical membranes of said flexible material extending across the cavity defined by said first and second flexible material portions and bonded together to at least one of said portions to define a plurality of separate chambers, said flexible material being semi-permeable so as to allow gradual filling of said chambers through said membranes with said gaseous medium while preventing rapid escape of said medium from said chambers upon a sudden impact.

9. A vehicle extension according to claim 8 wherein said vertical membranes of flexible material are bonded together to form a plurality of chambers which vary in horizontal cross-sectional area from chamber to chamber.

10. A vehicle extension according to claim 8 wherein said vertical membranes are bonded together by adhesive in vertical strips so as to define hexagonally-shaped chambers which are elongated in the vertical direction.

11. A vehicle extension according to claim 8 wherein said separate chambers are of a smaller horizontal cross section near the outside of the extension than the inside so that the outer portions of said structure are proportionately stronger than the interior.

12. A vehicle extension according to claim 1 further including pressure relief valve means for exhausting said gaseous medium from said inner structure and outer shell whenever the pressure therein exceeds a predetermined limit.

13. A vehicle extension assembly according to claim 1 wherein said means for introducing a gaseous medium is a pump selectively activated in accordance with the speed of the vehicle so as to inflate said assembly into different aerodynamic shapes depending on vehicle speed.

14. An extension assembly for vehicles in accordance with claim 1 wherein said assembly is proportioned to cover the front of the vehicle and wherein said interior structure has a tautened shape which converges forward to penetrate the air and create laminar flow around the front of the vehicle during forward movement.

15. An extension assembly according to claim 1 wherein said assembly is proportioned to cover the rear of a vehicle and wherein said interior structure has a tautened shape which converges in the rearward direction to create a smooth, gradual flowing together of the effective rear surfaces of the vehicle so as to prevent turbulence around the rear edges of the vehicle.

16. A method for fabricating a plurality of chambers from a single sheet of flexible fabric in an inflatable bumper assembly for vehicles, said method comprising
using a first rectangular portion of said sheet as a rear wall section
folding the sheet along one edge of said first portion to define a second wall portion adjacent said first wall portion
bonding said second wall portion to said first wall portion along a first set of spaced parallel lines running transverse of said sheet material perpendicular to said folded edge
folding the sheet in the opposite direction along the opposite edge of said second wall portion to define a third wall portion adjacent said second wall portion
bonding said third wall portion to said second wall portion along a second set of spaced parallel lines running transverse to the sheet material perpendicular to said folded edges, said second set of parallel lines being equally interspersed between said first set of parallel lines
repeating said folding and bonding steps to define successive wall portions of said sheet material and
separating the unbonded portions of adjacent wall portions to define a plurality of elongated tubes extending parallel to each other and parallel to said bonding lines.

17. The method according to claim 16 for fabricating a plurality of chambers in a bumper assembly further including the step of folding said sheet along the edge of said first wall portion opposite the fold for said second wall portion, extending the sheet around the distal ends of said elongated tubes to define a flexible exterior skin surrounding said tubes, and bonding said exterior shell material to said folds of said wall portions so that the wall portions separate from each other during expansion of said outer skin.

18. A method for manufacturing a bumper assembly for vehicles comprising
fabricating a plurality of chambers in accordance with the method of claim 17 and encasing said chambers with an elastomeric, air-tight outer shell and
bonding said first wall portion and said flexible outer skin of the chambers to selected portions of said elastomeric outer shell so that upon inflation of said outer shell said wall portions are separated to define chambers.

19. A shock absorbing extension assembly for a vehicle comprising a substantially air-tight outer shell of stretchable elastomeric material
an interior structure of flexible; semi-permeable but substantially non-stretchable material defining (a) an outer skin selectively coupled to said elastomeric shell and shaped to define a desired exterior contour when pulled taut and (b) a plurality of flexible membranes interior to said outer skin and supported within said outer skin so as to define a plurality of separate chambers each having a closed boundary of said semi-permeable material and
means for introducing a gaseous medium through said outer shell so as to expand said shell toward said desired contour, said semi-permeable material being porous enough to allow passage of said gaseous medium from chamber to chamber at a gradual rate while allowing a substantial pressure differential to develop between adjacent chambers upon an sudden impact against one of said chambers.

20. A shock absorbing vehicle extension assembly according to claim 19 wherein said stretchable elastomeric material is rubber and said semi-permeable material is Dacron polyester.

21. A shock absorbing vehicle extension assembly according to claim 19 wherein said flexible membranes are bonded together by an adhesive to form said chambers.

22. A shock absorbing vehicle extension according to claim 19 wherein said plurality of chambers include parallel tubes that are elongated vertically and which have a hexagonal cross-sectional shape when expanded.

23. A shock absorbing vehicle extension according to claim 19 wherein said plurality of chambers include parallel tubes which are elongated vertically and have a substantially rectangular cross-sectional shape when expanded.

24. A shock absorbing vehicle extension according to claim 19 wherein said semi-permeable material has selected portions thereof treated to reduce their porosity.

25. A shock absorbing vehicle extension assembly according to claim 19 wherein said plurality of chambers include a first group of relatively smaller chambers in proximity to the outer skin of said interior structure and at least one relatively larger chamber substantially interior to said outer skin.

26. A shock absorbing vehicle extension assembly according to claim 25 further including valve means associated with said outer shell for automatically allowing the gaseous medium to escape from said larger chambers whenever the pressure within said chamber exceeds a predetermined amount.

27. A shock absorbing vehicle extension according to claim 26 wherein said valve means is a mechanical pressure relief valve adapted to open at a pressure which is slightly lower than the maximum pressure that can be sustained within said larger chamber without rupturing of the walls thereof.

28. A shock absorbing vehicle extension assembly according to claim 26 wherein said valve means is defined by selected areas of reduced strength in said outer skin and elastomeric outer shell that break to allow an escape of the gaseous medium prior to failure of the interior chambers during impact.

29. A shock absorbing vehicle extension assembly according to claim 19 wherein said means for introducing a gaseous medium into said shell includes a source of highly compressed gas and valve means remotely controllable by the vehicle operator to provide for rapid transfer of gas from said source to said shell.

30. A shock absorbing extension assembly for trains comprising an outer shell of substantially air-tight elastomeric material
   support means for mounting said elastomeric shell to the advancing end of said train
   an interior structure of flexible, non-stretchable material defining (a) an outer skin selectively coupled to said elastomeric shell and shaped to define a desired exterior shape when expanded to its tautened condition and (b) a plurality of flexible membranes interior to said outer skin and defining a plurality of chambers each having a closed outer boundary of said semi-flexible material, selected ones of said boundaries between said chambers having means for allowing air passage between said chambers at a controlled rate, and
   means for introducing a gaseous medium into said shell so as to expand said shell toward said desired contour.

31. A shock absorbing extension assembly for trains according to claim 30 wherein said means for introducing a gaseous medium into said shell includes a source of compressed gas and a valve means remotely controllable by the train operator for transferring said compressed gas from said source to said shell to provide for rapid inflation of said extension assembly.

32. A structural extension assembly for vehicles comprising:
   a substantially air-tight outer shell of elastomeric material
   means for mounting said shell for support by the vehicle
   an interior structure of Kevlar woven sheet material coupled to the inside surfaces of said outer shell and shaped to define a desired shape for the assembly when the Kevlar material is tautened, and
   a pressurized gaseous medium within said outer shell and inner structure for expanding said shell to said desired shape as defined by the Kevlar material.

33. A structural extension assembly according to claim 32 wherein said interior structure further includes a plurality of membranes of said Kevlar material bonded together to define a plurality of substantially closed compartments within said desired shape, said Kevlar material being woven into a semi-permeable fabric so as to allow equalization of pressures across said membranes at a first relatively slow rate while preventing an equalization of pressures through said membranes at a second relatively fast rate.

34. A structural extension assembly for vehicles according to claim 32 further including means for selectively introducing said gaseous medium into said outer shell and said inner structure so as to expand the assembly from a relaxed shape to a second tautened shape defined by said Kevlar material.

35. A bumper assembly for attachment to an outer portion of a vehicle for absorbing impacts with other vehicles or objects, comprising:
   an outer shell of flexible material and wall portions of flexible material within said shell defining a multiplicity of cells filled with a gaseous medium, said gaseous medium in each cell being pressurized in response to impacts to absorb and store impact energy, and
   pressure release means operative under severe impact conditions to cause the progressive timed release of the gaseous medium from said cells to release stored energy, minimize rebound action, and to gradually reduce to zero the relative velocity between the vehicle and another vehicle or object engaged by said assembly.

36. A bumper assembly as defined in claim 35, said pressure release means including relief valve means coupled to certain ones of said cells.

37. A bumper assembly as defined in claim 35, said wall portions of at least some of said cells being of a frangible material arranged to rupture at predetermined pressures to form at least part of said pressure release means.

38. A bumper assembly as defined in claim 35, said wall portions being of a material having sufficient perviousness to permit slow transfer of the gaseous medium from one cell to another and equalization of pressure under normal conditions while being sufficiently impervious to prevent transfer under impact conditions.

* * * * *